United States Patent [19]

Hunger

[11] 4,140,013
[45] Feb. 20, 1979

[54] FLOW METER

[75] Inventor: Erhard Hunger, Berlin, Fed. Rep. of Germany

[73] Assignee: Siemens Aktiengesellschaft, Munich, Fed. Rep. of Germany

[21] Appl. No.: 771,758

[22] Filed: Feb. 24, 1977

[30] Foreign Application Priority Data

Mar. 1, 1976 [DE] Fed. Rep. of Germany ....... 2608953

[51] Int. Cl.² .................................................. G01F 1/75
[52] U.S. Cl. ........................................................ 73/229
[58] Field of Search ............... 73/229, 231 R, 231 M, 73/253, 258, 197; 324/173, 174

[56] References Cited

U.S. PATENT DOCUMENTS

| 3,039,311 | 6/1962 | Bassett | 73/258 |
| 3,169,398 | 2/1965 | Sparling et al. | 73/231 |
| 3,344,666 | 10/1967 | Rilett | 73/231 |
| 3,379,059 | 4/1968 | Wiley | 73/231 |
| 3,562,645 | 2/1971 | Hewlett, Jr. | 324/78 |
| 3,610,039 | 10/1971 | Althouse et al. | 73/231 |
| 3,623,835 | 11/1971 | Boyd | 73/231 |
| 3,826,985 | 7/1974 | Wiley | 324/173 |

Primary Examiner—Herbert Goldstein
Attorney, Agent, or Firm—Kenyon & Kenyon, Reilly, Carr & Chapin

[57] ABSTRACT

A flow meter for metering the flow of gaseous or liquid media comprising a rotatably movable measuring organ, a measured-value pickup device for obtaining an electrical quantity corresponding to the revolutions of the measuring organ, and an evaluating device connected to the measured-value pickup device. In accordance with the invention, the flow meter is further provided with a voltage generator responsive to the measuring organ and with a means for coupling the output voltage of the generator via an electrical buffer device to the measured-value pickup device and/or the evaluating device.

4 Claims, 7 Drawing Figures

FLOW METER

BACKGROUND OF THE INVENTION

1. Field of the Invention

The invention relates to a volume measuring instrument or flow meter for measuring the flow of gaseous or liquid media and, in particular, to a flow meter having at least one rotatably movable measuring organ, a measured-value pickup device responsive to the measuring organ for obtaining an electrical quantity corresponding to the revolutions of the organ, and an evaluating device connected to the measured-value pickup device.

2. Background of the Invention

In one knwon flow meter of above type, the measured-value pickup device comprises a reed relay mechanism with a revolving support element driven by a rotatably movable measuring organ. This latter support element carries a mangetically conductive ring and is moved by the organ past the reed relay which is connected into a circuit with a supply voltage source and a counter. When the reed relay operates, both its contacts are closed and a current pulse flows to the counter. This known flow meter, therefore, requires the use of a separate supply voltage source, which may be formed, for example, by a storage battery.

Also known is another flow meter comprising an electronic pulse generator which contains a stationary coil. An a-c voltage is induced in this coil by a ring magnet coupled to and moved by a rotatably movable measuring organ included in the meter. This a-c voltage is processed in an evaluating device which contains, besides a voltage amplifier, a Schmitt trigger and an electronic counter. The aforesaid evaluating device requires for the operation of its individual parts a supply voltage, which is made available by a separate supply voltage source.

Thus, in all the known flow meters which employ a measuring organ and a measured-value pickup device responsive to the organ for deriving an electrical quantity corresponding to the revolutions of the organ, a separate supply voltage source is required. These meters thus differ in this respect from flow meters in which the processing of the picked-up measurement value and its evaluation are effected by number wheels driven by the movable measuring organ in a mechanical counting mechanism.

It is therefore an object of the present invention to provide a flow meter of the above type which does not require a separate supply voltage source.

SUMMARY OF THE INVENTION

In accordance with the principles of the present invention the above and other objectives are accomplished in a flow meter of the above type by further including therein a voltage generator responsive to the rotatably movable measuring organ and means for connecting the output voltage of the generator, to one of the measured-value pickup device and the evaluating device of the meter for supplying voltage to same. More particularly, the aforesaid generator is connected in driving relationship with the measuring organ and the means for connecting is provided with an electrical buffering device connected between the generator and the pickup device or evaluating device.

With the flow meter designed as aforesaid, the measurement value proper is derived from the flow energy of the gaseous or liquid medium to be measured, as well as the energy which is required for processing and displaying the measurement value. Analogous to purely mechanical flow meters, the flow meter according to the invention thus does not require an additional supply voltage source and is, therefore, independent of external energy sources.

In the flow meter of the present invention, the measured-value pickup device can be constructed in a number of different ways. Thus, for example, it may be construction as an electric pulse generator such as is described in the German Pat. No. 1,298,603. In such case, the pickup device generates a voltage which produces a current pulse for a counter when the contacts of the reed relay are operated.

However, the measured-value pickup device may also be constructed as a tachometer generator, so that it will then be independent of a supply voltage unit. For processing the voltage of the tachometer generator, however, a supply voltage is then necessary which is made available by the voltage generator of the flow meter.

The generator of the flow meter of the present invention can also be constructed in a number of different ways. Thus, it is considered advantageous to construct the generator as a separate structural component which is driven by the rotatably movable measuring organ. In such case, the output shaft of the rotatably movable measuring organ can be extended to the generator through the measuring chamber containing the organ.

In cases where the flow meter is desired to be as small as possible, it is advantageous to form the generator from a magnet arrangement carried by the measuring organ and from a winding arrangement fixedly mounted in a housing containing the measuring organ. The respective placement of the magnet arrangement with respect to the measuring organ and also the placement of the winding arrangement in the housing is determined in this case largely by the design of the flow meter itself.

Flow meters are frequently equipped with a magnetic coupling in order to transmit the rotary motions of the measuring organ through the wall of the measuring chamber containing the measuring organ to an indicating mechanism arranged outside the measuring chamber. In a flow meter of such design modified in accordance with the invention, it is advantageous to form the generator of the meter from the magnetic coupling and from a winding which is arranged adjacent to the coupling. For space reasons, it is considered particularly advantageous if the winding is fixedly arranged in the space between the two half portions of the magnetic coupling.

Such a design of the generator has the important advantage that an additional magnet arrangement is not required for its formation. Also the mounting of the winding presents no special problems in this arrangment of the generator, as the winding, being designed as flat as possible, can be fastened without difficulty to a partition between the half portions of the magnet coupling. Advantageously, a winding in the form of a printed circuit can be employed in the aforesaid case.

The evaluating device of the flow meter of the invention may contain an electronic counting chain and a display, the electronic counting chain being formed advantageously by integrated electronic building blocks in order to keep its energy requirements as low as possible. For the same reason, it appears advantageous if the display device contains liquid-crystal display elements of field-effect display elements.

BRIEF DESCRIPTION OF THE DRAWING

The above and other features and aspects of the present invention will become more apparent upon reading the following detailed description in conjunction with the accompanying drawings, in which.

DETAILED DESCRIPTION

Figure 1:
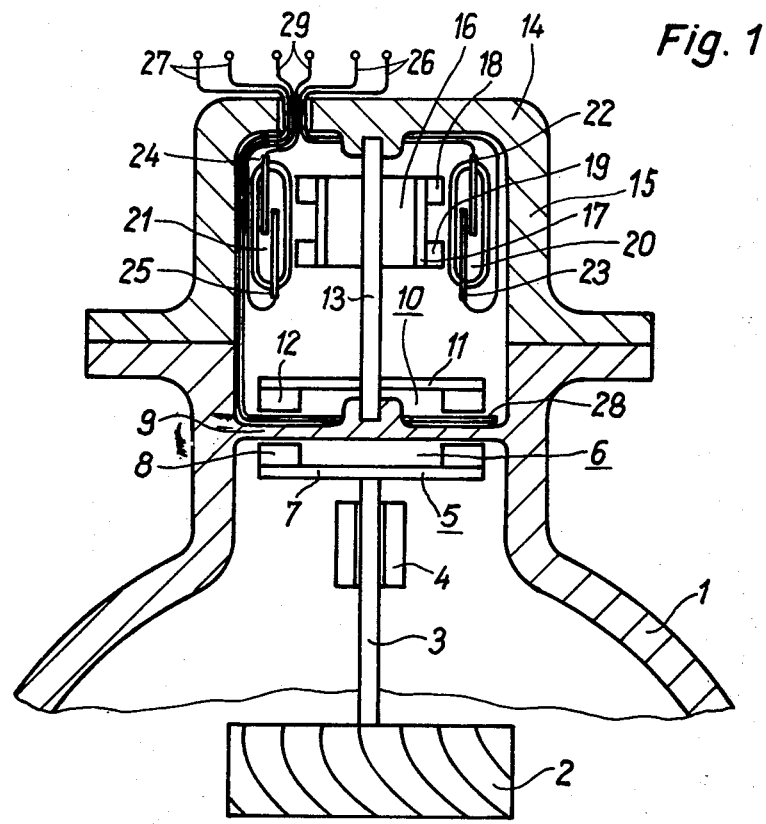
FIG. 1 shows a flow meter including a magnetic coupling and configured in accordance with the principles of the present invention.

FIG. 1 shows a flow meter in accordance with the principles of the present invention. To avoid overly complicating the drawings only those portions of the meter relevant to the invention are illustrated. The flow meter comprises a measuring chamber 1 in which is disposed a rotatably movable measuring organ or member 2 which is in the form of a turbine wheel. The measuring organ 2 is fastened on a shaft 3 which is supported in a bearing at the region 4. Fastened to the end of the shaft 3 facing away from the measuring organ 2, is a first half portion 5 of a magnetic coupling 6. The half portion of 5 the magnetic coupling 6 comprises a support disk 7, on which, for example, four magnets 8 are arranged around its circumference in such a manner that the magnets of different polarity alternate.

The half portion 5 of the magnetic coupling 6 is separated by a thin partition 9 of the measuring chamber 1 from the other half portion 10 of the coupling 6, the half portion 10 likewise comprising a support disk 11 around whose circumference are arranged four magnets 12 which alternate in polarity. The support disk 10 is fastened on a shaft 13, which is supported in the partition 9. A further bearing point for the shaft 13 is located in the cover 14 of a further housing part 15, which is bolted to the measuring chamber 1.

The shaft 13 above the support disk 10 further supports a support element 16 having a magnetically conducting ring 17, on which a number of permanent magnets 18 and 19 are located. When the shaft 13 rotates, the magnetically conducting ring 17 and its associated permanent magnets are moved thereby past a number of reed relays 20 and 21, the contacts 22, 23 and 24, 25, respectively, of which are closed and opened by the permanent magnets alternatingly.

The contacts 22, 23 and 24, 25 are connected via lines 26 and 27 into the circuit comprising a supply voltage source and an electromechanical counting mechanism, the latter element not being shown in FIG. 1. Thus an electrical pulse which is counted in the counter is generated upon each closing of the contacts 22, 23 and 24, 25, respectively. The count in the counter is, therefore, proportional to the rotary movement of the measuring organ 2 and hence, corresponds to the amount of liquid or gas that has run through the measuring chamber 1.

Between the half portions 5 and 10 of the coupling 6 is located a thin winding 28 which, together with the magnetic coupling 6, forms a generator. The ends 29 of the winding 28 extend out of the cover and form the voltage output of the generator. The generator together with a rectifier arrangement and a buffer device (not shown), in turn, form the aforesaid supply voltage source for the electromechanical counting mechanism. The flow meter of FIG. 1, therefore, requires no additional external supply voltage for generating pulses.

Figure 2:
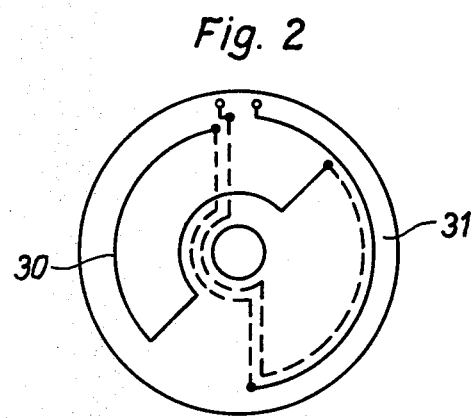
FIG. 2 illustrates a winding arrangement useable in the flow meter of FIG. 2.

FIG. 2 shows a top view of a winding which can be used for the winding 28 of the flow meter of FIG. 1. The winding is in the form of a printed circuit board 31 having the turns 30 situated in part on different sides so that the conductors are supported as required. The illustrated winding is particularly flat and can, therefore, be accommodated at the partition 9 between the half portions 5 and 10 of the magnetic coupling 6 without interfering with the operation of the coupling.

Figure 3:
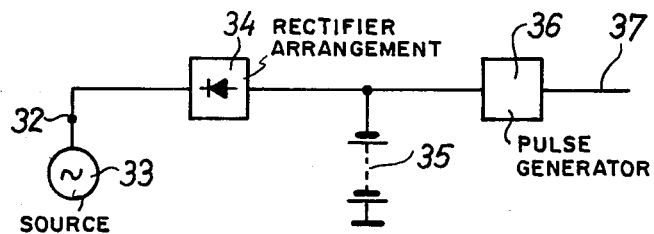
FIG. 3 shows in block diagram form, the generator of a flow meter in accordance with the invention used for supplying power to the measured-value pickup device of the meter.

FIG. 3 shows a block diagram of the connection of the voltage generator of FIG. 1 to its respective rectifier arrangement and buffer device to form the voltage source for the electromechanical counting meachanism. The generator is symbolically depicted by a source 33 whose output voltage 32 is connected via a rectifier arrangement 34 to a buffer device 35, which, for example, may be a buffer storage battery. Connected to the buffer device 35 is a pulse generator, the pulses of which can be transmitted via a connecting line 37 to a counting device, not shown. The pulse generator 36 may, for example, take the form of the pulse generator structure shown in FIG. 1.

The rectifier 34 can be disposed, together with the buffer device 35, in the housing 15 of the flow meter of FIG. 1. However, it is also possible to mount the rectifier and the buffer storage device in an additional housing, physically separated from the flow meter, together with the display device.

Figure 4:
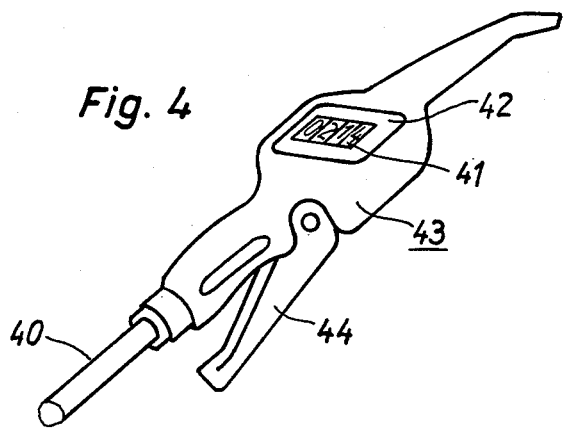
FIG. 4 shows the generator of a flow meter in accordance with the invention incorporated into a hand counter.

FIG. 4 shows a flow meter in accordance with the invention, designed in the form of a hand counter. In this configuration the main elements of the flow meter described in connection with FIG. 1 are located at the end of a hose line 40, which is in connection, via a pump, not shown, with a tank, also not shown, containing the liquid to be metered. The flow meter additionally includes a display device 41, which is formed by liquid-crystal display elements. The display is on the upper side 42 of a housing 43, in the interior of which is located, in addition to an opening valve that can be operated by a handle 44, the rotatably movable measuring organ of the meter. In this configuration, the generator of the meter furnishes the supply voltage for an elecrical evaluating device which contains, in addition to an electronic counter the display device 41. The housing 43 also contains the measured-value pickup device of the meter, which device generates pulses related to the flow of the liquid being metered.

Figure 5:
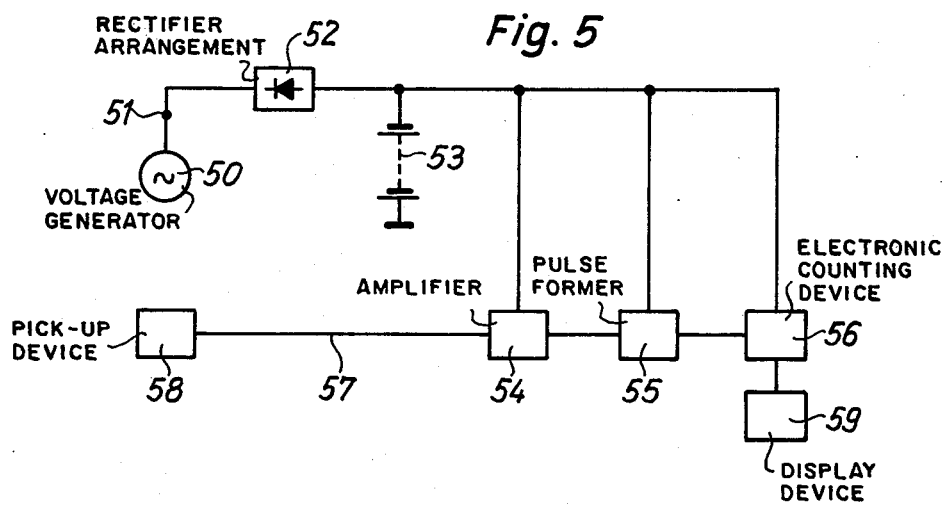
FIG. 5 shows in block diagram form the voltage generator of the flow meter of FIG. 4.

FIG. 5 shows in greater detail the circuit of the flow meter according to FIG. 4. A voltage generator 50, which is driven by the measuring organ or member, not shown, has its output voltage 51 coupled to a buffer device 53 via a rectifier arrangement 52. The generator 50 supplies supply voltage via the buffer device 53 to an amplifier 54, as well as to a pulse former 55 and an electronic counting device 56. The amplifier 54 is also connected, via a line 57, to a measured-value pickup device 58, which may be formed, for example, by an additional tachometer generator or an electric pulse generator. The count in the counting device 56, therefore, corresponds to the quantity of liquid that has flowed through the flow meter. The count of the counting device 56 is displayed in a display device 59. The latter display device 59 may contain field-effect display elements, as well as liquid-crystal display elements.

The advantage of the flow meter of FIGS. 4 and 5 is that, due to the use of an electrical measured-value pickup device and electrical evaluating device, a relatively small and, therefore, handy flow meter is produced, which does not require an additional supply voltage source in spite of containing these electronic components.

Figure 6:
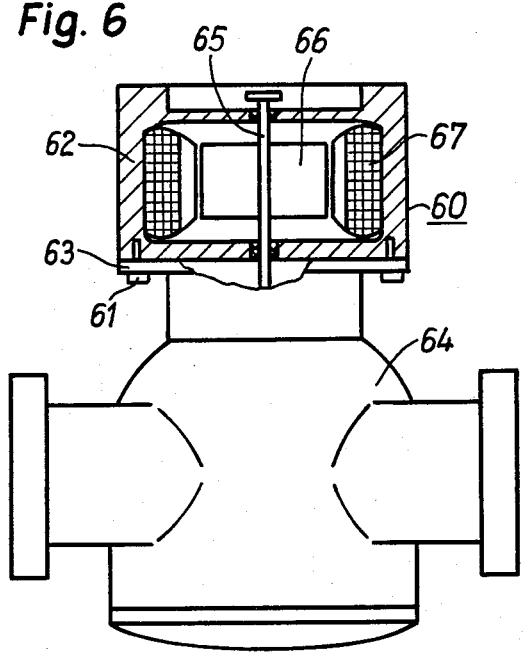
FIGS. 6 and 7 show further flow meters in accordance with the principles of the invention.

In the flow meter of the invention shown in FIG. 6, the generator 60 of the meter is disposed in a separate structural unit whose housing 62 is bolted by means of screws 61 to the flange 63 of a housing 64. The housing 64 houses the rotatably movable measuring organ of the meter, the latter organ being connected to a shaft 65 of the generator 60. A magnet arrangement 66 attached to the shaft 65 is set in rotary motion by the rotatably movable measuring organ. This induces in the winding arrangement 67 surrounding the magnet arrangement 66 an electric voltage which can be utilized as the supply voltage.

Figure 7:
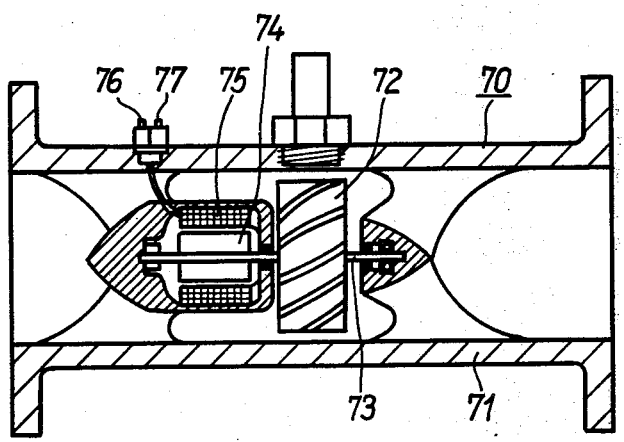

In the flow meter of the invention shown in FIG. 7, the flow meter is formed as a turbine counter 70, wherein a turbine wheel 72, through which the medium to be measured flows, is supported on a shaft 73. The shaft 73 supports on one of its ends a magnet arrangement 74 which moves in a winding arrangement 75. The winding arrangement, thus, provides a voltage at the terminals 76 and 77 which can be used as the supply voltage.

In summary, therefore, the present invention is a flow meter which comprises an electrical measured-value pickup and evaluation device which requires no separate supply voltage source, as not only the measurement value is derived from the gaseous or liquid medium to be measured, but the meter also includes means responsive to the energy of such medium for supplying a supply voltage for operating the measured-value pickup and the evaluating device.

What is claimed is:

1. In a flow meter for metering the flow of a medium, said flow meter comprising a chamber in which is disposed at least one rotatably moveable measuring organ, a measured value pickup device for deriving an electrical quantity corresponding to the revolutions of said measuring organ, and an evaluating device responsive to the pickup device, the improvement comprising:
   (a) a voltage generator separate from said pickup device and connected in driving relationship with said measuring organ, said generator comprising a magnetic coupling responsive to said measuring organ for providing an indication of the rotary movement of said measuring organ and a winding arrangement disposed adjacent said magnetic coupling providing an output voltage; and
   (b) means responsive to the output voltage of said winding arrangement for supplying power to one of said pickup device and said evaluating device.

2. A flow meter in accordance with claim 1 wherein: said magnetic coupling includes separated half portions; and said winding arrangement is fixedly arranged between said half portions.

3. A flow meter in accordance with claim 1 wherein: said winding arrangement is a printed circuit.

4. A flow meter in accordance with claim 1 wherein: said electrical evaluating device comprises: an electronic counting chain including a number of connected electrical building blocks; and a display device.

* * * * *